(12) United States Patent
Buckley

(10) Patent No.: US 10,711,567 B2
(45) Date of Patent: Jul. 14, 2020

(54) FRAC PUMP SEAT ASSEMBLY

(71) Applicant: ST9 Gas and Oil, LLC, The Woodlands, TX (US)

(72) Inventor: Chris Buckley, Tomball, TX (US)

(73) Assignee: ST9 GAS AND OIL, LLC, The Woodland, TX (US)

( * ) Notice: Subject to any disclaimer, the term of this patent is extended or adjusted under 35 U.S.C. 154(b) by 154 days.

(21) Appl. No.: 15/956,679

(22) Filed: Apr. 18, 2018

(65) Prior Publication Data

US 2018/0298722 A1 Oct. 18, 2018

Related U.S. Application Data

(60) Provisional application No. 62/486,798, filed on Apr. 18, 2017.

(51) Int. Cl.
| | |
|---|---|
| *E21B 34/06* | (2006.01) |
| *F04B 53/12* | (2006.01) |
| *F04B 53/00* | (2006.01) |
| *F04B 53/10* | (2006.01) |
| *F04B 1/0452* | (2020.01) |
| *F16K 1/46* | (2006.01) |
| *F16K 25/00* | (2006.01) |

(52) U.S. Cl.
CPC ............ *E21B 34/06* (2013.01); *F04B 1/0452* (2013.01); *F04B 53/005* (2013.01); *F04B 53/1087* (2013.01); *F04B 53/125* (2013.01); *F16K 1/465* (2013.01); *F16K 25/005* (2013.01); *F04B 2201/06* (2013.01); *Y10T 137/4273* (2015.04)

(58) Field of Classification Search
CPC .... E21B 34/06; F04B 1/0452; F04B 53/1087; F04B 53/005; F04B 53/125; F04B 2201/06; F16K 1/465; F16K 25/005; Y10T 137/4273
USPC .......................... 251/363, 332, 333; 137/242
See application file for complete search history.

(56) References Cited

U.S. PATENT DOCUMENTS

| | | | | |
|---|---|---|---|---|
| 1,316,539 A | * | 9/1919 | Ford .......................... | F16K 1/42 251/363 |
| 1,540,380 A | * | 6/1925 | Wilson ...................... | F16K 1/42 251/363 |
| 1,947,071 A | * | 2/1934 | Walton ................ | F04B 53/1022 251/172 |
| 1,948,628 A | * | 2/1934 | Penick ................ | F04B 53/1027 251/332 |
| 1,985,382 A | * | 12/1934 | Schachter ............... | F16K 1/425 251/363 |
| 1,991,974 A | * | 2/1935 | Broecker ................ | F16K 15/20 137/231 |

(Continued)

*Primary Examiner* — John Bastianelli

(57) ABSTRACT

A frac pump valve seat assembly includes a seat body and a wiper seal. The seat assembly is configured to mitigate the risk of fluid end erosion in the valve seating area by automatically clearing or wiping the mating surface of the fluid end at the time of installation. The wiper seal is located at a lower portion of the seat body and is designed to interface therewith the mating surface of the fluid end. Upon installation, the wiper seal scrapes or cleans the mating surface of propellants, sand, and other contaminants that may remain after initial cleaning. The contact surface of the seat body is optionally further reinforced with material implants with greater hardness than the material of the seat body.

25 Claims, 3 Drawing Sheets

(56) References Cited

U.S. PATENT DOCUMENTS

| | | | | |
|---|---|---|---|---|
| 2,069,297 A | * | 2/1937 | Abercrombie | F16K 15/06 |
| | | | | 137/533.19 |
| 2,192,339 A | * | 3/1940 | Wilson | F16K 1/34 |
| | | | | 251/334 |
| 2,263,750 A | * | 11/1941 | Willke | F16K 1/42 |
| | | | | 137/540 |
| 2,329,576 A | * | 9/1943 | Anderson | F04B 53/1027 |
| | | | | 137/516.29 |
| 2,700,983 A | * | 2/1955 | Bryant | F16K 17/0473 |
| | | | | 137/505.11 |
| 2,983,281 A | * | 5/1961 | Bynum | F04B 53/1087 |
| | | | | 137/543.23 |
| 3,191,617 A | * | 6/1965 | Maddox | F24C 15/104 |
| | | | | 137/516.29 |
| 3,521,667 A | * | 7/1970 | Johnson | F16K 27/02 |
| | | | | 137/454.6 |
| 4,471,943 A | * | 9/1984 | Nelson | F16K 3/02 |
| | | | | 251/327 |
| 4,493,336 A | * | 1/1985 | Renfro | F16K 1/02 |
| | | | | 137/312 |
| 2011/0079302 A1 | * | 4/2011 | Hawes | F16K 25/005 |
| | | | | 137/538 |
| 2013/0032745 A1 | * | 2/2013 | Stein | F04B 53/10 |
| | | | | 251/333 |
| 2015/0144826 A1 | * | 5/2015 | Bayyouk | F16K 25/005 |
| | | | | 251/359 |
| 2016/0215588 A1 | * | 7/2016 | Belshan | F16K 31/12 |

* cited by examiner

FRAC PUMP SEAT ASSEMBLY

CLAIM OF PRIORITY

This application claims the benefit of U.S. Provisional Application No. 62/486,798, filed 18 Apr. 2017. The information contained therein is hereby incorporated by reference.

BACKGROUND

1. Field of the Invention

The present application relates generally to a reciprocating pump, and in particular to a seat assembly for use with either a suction valve or discharge valve.

2. Description of Related Art

Hydraulic fracturing can increase the rate of production of oil and gas from low-permeability reservoirs. Hydraulic fracturing increases the permeability of reservoir rocks by opening channels through which oil and gas can travel to recovery wells. During hydraulic fracturing, a fluid is pumped through a wellbore under high pressure into a subterranean reservoir where it splits or fractures the reservoir rock. A proppant, like sand, is often added to the pumped fracture fluid and carried in suspension into the newly formed fractures. When pumping ceases, the fractures partially close on the proppant, leaving open channels for oil and gas to flow to the recovery well, i.e., the wellbore through which the fracture fluid was originally pumped.

High-pressure pumps are used to complete hydraulic fracturing procedures or "frac jobs." These pumps have "fluid ends" within which a number of reciprocating plungers pressurize the fracture fluid. Suction and discharge valves control fluid flow to, and from, the plungers. These valves selectively contact a seat thereby regulating movement of the fracture fluid through the fluid end.

A number of issues can arise with conventional seats. Each seat is tapered and presently requires manual cleaning during initial assembly. Residual contamination is not allowed during the fit up. Efforts to clean or remove contaminants requires a secondary operation but presently there does not appear to be a solution to clean the area while assembling. A second issue relates to the excessive repeated forces exerted by the valves upon contacting the seat. Over time, the combination of the course fracture fluid combined with the repetitive forces from the valve can lead to premature wear, eroding, and fracturing of the seat during operation.

Although great strides have been made with respect to fluid ends and valve seats, considerable shortcomings remain. An improved seat assembly is needed to clean mating surfaces at the time of assembling in the fluid end and increase resistance to the repetitive forces and premature failure.

SUMMARY OF THE INVENTION

It is an object of the present application to provide a valve seat assembly configured to mitigate the risk of fluid end erosion in the valve seating area by automatically clearing or wiping the mating surface of the fluid end at the time of installation. A wiper seal is located at a lower portion of the seat body and is designed to interface therewith the mating surface of the fluid end. Upon installation, the wiper seal scrapes or cleans the mating surface of propellants, sand, and other contaminants that may remain after initial cleaning.

It is a further object of the present application that the wiper seal is configured to flex so as to contour to the surface of the mating surface. The wiper seal is designed to extend around the periphery of the seat body and maintain a selected level of contact pressure on the mating surface around the periphery of the seat body.

It is a further object of the present application to introduce a material implant into a valve seat surface located within an internal surface of the central channel of the seat body. The material implant is configured to have a hardness greater than the seat body material. One or more material implants are located about the circumference of the internal tapered surface and are configured to increase the longevity of the internal surface from repetitive contact with a valve. Ultimately the invention may take many embodiments. In these ways, this assembly overcomes the disadvantages inherent in the prior art.

The more important features of the assembly have thus been outlined in order that the more detailed description that follows may be better understood and to ensure that the present contribution to the art is appreciated. Additional features of the system will be described hereinafter and will form the subject matter of the claims that follow.

Many objects of the present assembly will appear from the following description and appended claims, reference being made to the accompanying drawings forming a part of this specification wherein like reference characters designate corresponding parts in the several views.

Before explaining at least one embodiment of the system in detail, it is to be understood that the assembly is not limited in its application to the details of construction and the arrangements of the components set forth in the following description or illustrated in the drawings. The assembly is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the various purposes of the present system. It is important, therefore, that the claims be regarded as including such equivalent constructions insofar as they do not depart from the spirit and scope of the present system.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
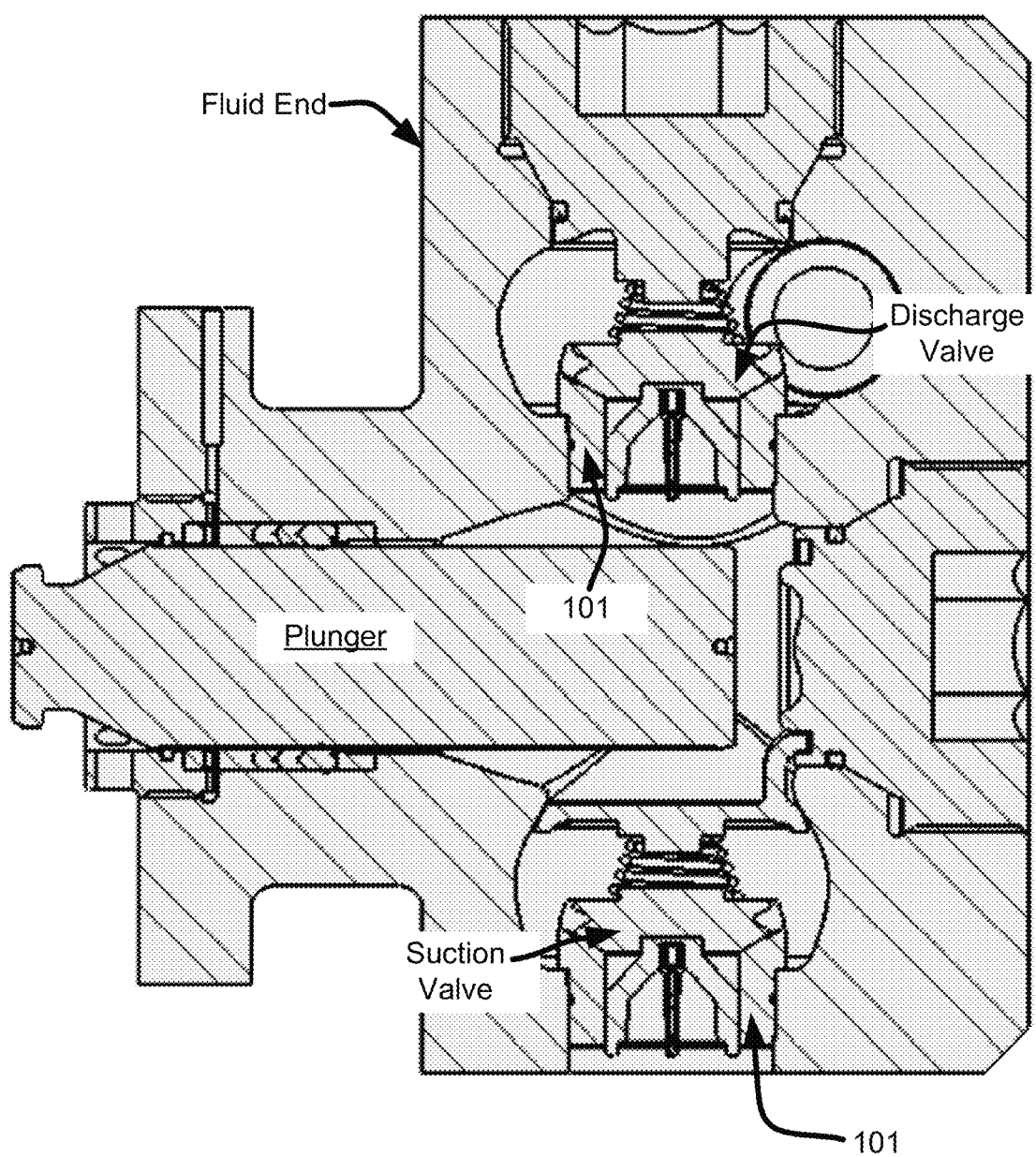
FIG. 1 is a section view of a fluid end showing a valve assembly seated into a frac pump valve seat assembly according to an embodiment of the present application.

While the assembly and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the assembly described herein may be oriented in any desired direction.

The assembly in accordance with the present application overcomes one or more of the above-discussed problems commonly associated with conventional seats in fluid ends. Specifically, the interfacing seat of the present application is configured to include a wiper along a lower edge of the seat to wipe away contaminants during assembly. Additionally, the interfacing seat can further include localized reinforced pillars made from more hardened and resistant materials to mitigate the effects of the valve upon contact. Although described in particular with the use of a fluid end, it is understood that the interfacing seat with piles can be used in numerous applications where two surfaces impact, causing wear and not just with fracing. Additionally, the wiper can be used on any taper assembly application and not just with fluid ends. These and other unique features of the device are discussed below and illustrated in the accompanying drawings.

The assembly and method will be understood, both as to its structure and operation, from the accompanying drawings, taken in conjunction with the accompanying description. Several embodiments of the assembly may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

The assembly and method of the present application is illustrated in the associated drawings. The assembly includes a seat body and a wiper seal. The seat body is configured to be located within a fluid end with use of either of the discharge valve and the suction valve. The wiper seal is configured to clean or wipe the mating surface of the fluid end upon installation of the seat assembly. The wiper seal extends around the periphery of the seat body and has a seal diameter larger than the seat body. The wiper seal flexes in accordance with the contour of the mating surface. Additional material implants are optionally included to increase the longevity and durability of the contact surface internally within a central channel of the seat body. Additional features and functions of the device are illustrated and discussed below.

Referring now to the Figures wherein like reference characters identify corresponding or similar elements in form and function throughout the several views. The following Figures describe the assembly of the present application and its associated features. With reference now to the Figures, an embodiment of the modular observation assembly and method of use are herein described. It should be noted that the articles "a", "an", and "the", as used in this specification, include plural referents unless the content clearly dictates otherwise.

Referring now to FIG. 1 in the drawings, a side section view of a fluid end showing a valve seat assembly of the present application is illustrated. Fracture fluid is configured to enter and leave the fluid end as a plunger is reciprocated between two positions. The plunger and fluid end operate to pressurize the fracture fluid for use in completing hydraulic fracturing procedures. The fracture fluid enters through a suction valve and leaves in a pressurized state through a discharge valve. Each valve opens and closes to regulate movement of the fracture fluid through the fluid end as the plunger reciprocates.

Figure 2:
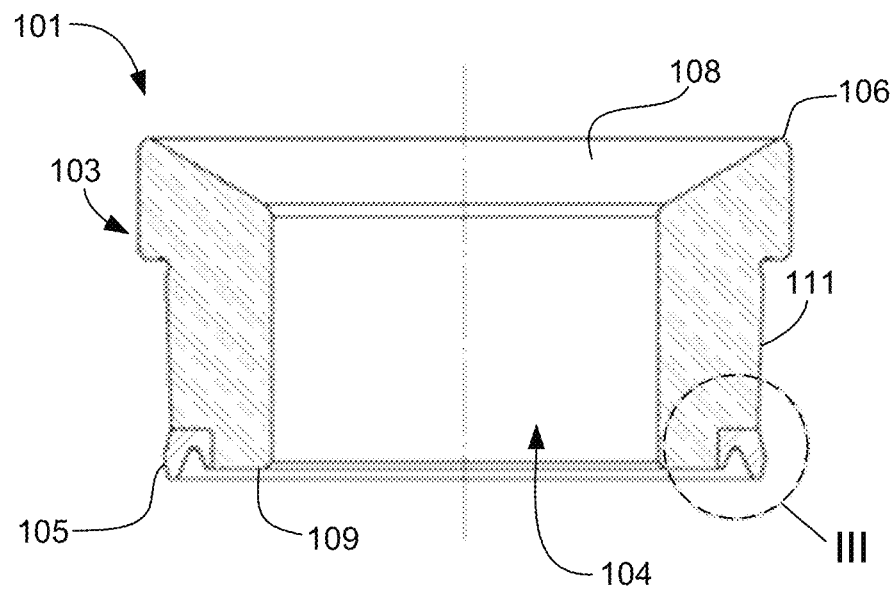
FIG. 2 is a side section view of the seat assembly of FIG. 1.
Figure 3:
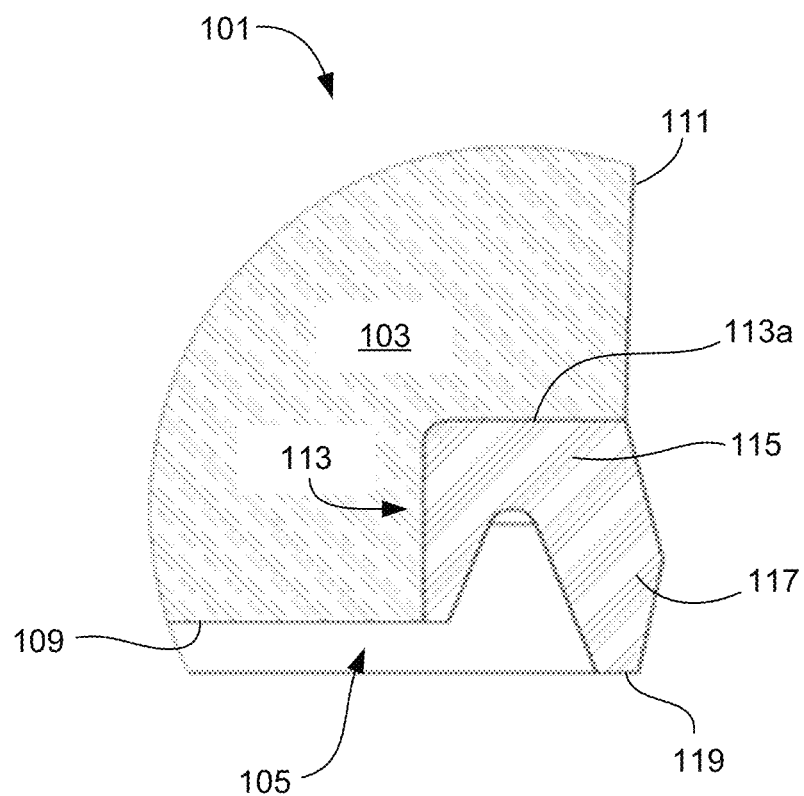
FIG. 3 is an enlarged side view of the seat assembly of FIG. 2.

Referring now also to FIGS. 2 and 3 in the drawings, views of seat assembly 101 are illustrated. Seat assembly 101 includes a seat body 103 and a wiper seal 105. Assembly 101 is configured to clean mating surfaces at the time of assembling within the fluid end. Body 103 includes a central channel 104 extending between upper surface 106 and lower surface 109. Central channel 104 tapers outward, thereby opening up, adjacent surface 106. Body 103 has an outer surface 111 that defines an exterior outer diameter.

Wiper 105, in particular, contacts the walls of the fluid end and wipes away contaminants as seat 101 is inserted. Wiper 105 is configured to mitigate the risk of Fluid End erosion (washout) in the valve seating area of the Fluid End. Over time, when a seat becomes worn, it can be very difficult to clean the mating surface in the fluid end that accepts the seat. This is a result of physical restraints (i.e. space). When replacing worn seats it is difficult to thoroughly clean the mating surfacing in the Fluid End due to the physical constraints (space) within the Fluid End. If the bore is not completely cleaned, scoring damage can occur, which is where erosion (washout) begins to propagate. Wipers 105 interface with the taper in the bore to scrape/clean any detritus (propellants, sand, etc.) that remain after initial cleaning.

Wiper 105 is in communication with a lower surface 109 of seat body 103. In general, the location can be moved about depending on embodiments, therefore it is understood that the location of wiper 105 is adjacent at least one of outer surface 111 and/or lower surface 109 along a base portion of body 103. Seat body 103 has an outer diameter defined by outer surface 111. Wiper 105 is configured to have a seal diameter that is greater than the outer diameter of body 103. This ensures proper contact between wiper 105 and the mating surface of the fluid end.

As seen in greater detail from FIG. 3, wiper 105 is coupled to the seat body 103 within a predefined recessed area 113. The recessed area being is defined as an inward protrusion at a surface of the seat body 103. The recessed area 113 may be a notch 113a as depicted, or may be a groove, along either lower surface 109 and/or outer surface 111. As depicted, recessed area 113 is a notch 113a that is formed in both outer surface 111 and lower surface 109

Wiper 105 is coupled to seat body 103 by the use of known attachment methods, including interference fit and adhesives for example. Wiper 105 is configured to be selectively detachable from seat body 103 to permit adjustment and the ability of a worker to match the needs of assembly 101 with the mating surfaces.

Wiper 105 includes a lip 117 and a base 115. Base 115 is located in contact with and is coupled to body 103 within recessed area 113. Furthermore, it is preferred that wiper 105 includes lip 117 wherein lip 117 protrudes outward from base 115 away from body 103. Lip 117 includes a tip 119 to promote efficient and effective cleaning. This seal would interfere, scrape, and remove contamination from the mating interface during insertion of the seat. The intention of wiper 105 is to make the surface intuitively clean while being assembled simply by assembling the seat into the mating part.

It is preferred that the geometry of the lip 117 is ideally suited for a shape of a "U" as seen in FIG. 3 where a groove exists partially between lip 117 and base 115. The idea is to allow lip 117 continuous interference as its diameter may adjust as it flexes about base 115 when contacting the mating surface of the bore. Flexure may occur in both inward and outward directions to permit continuous contact with the mating surface so as to flex in response to mating pressure. This shape would help to maintain constant pressure during insertion.

It is understood that wiper 105 extends around the full periphery of seat body 103 beyond outer surface 111 also being larger in diameter than the major diameter of the bore of the mating surface for which it will be inserted. As assembly 101 is inserted, the protruding lip 117 scrapes the bore of the mating surface thereby removing any contamination. It is understood that wiper 105 may be formed into various shapes and configurations in an attempt to perform the same task.

It is also understood that many other types and shapes of wipers can be conceived of to perform the tasks herein described. Such examples can include a D-ring seal and an O-ring seal wherein no particular tip is formed. Additionally, one or more inserts may be used in conjunction with wiper 105 that may be used to add rigidity and/or provide coupling force around the seat. These inserts may be metallic, composite, or plastic for example. Additionally, the wiper 105 may be located inset within the seat body 103, such as in a groove for example. Furthermore, as seen in FIG. 3, lip 117 also extends below lower surface 109, although not required. Any portion of wiper 105 may extend below lower surface 109 or outside of outer surface 111. The above descriptions and examples are not meant to be limiting, but serve exemplary purposes of other configurations possible.

Figure 4:
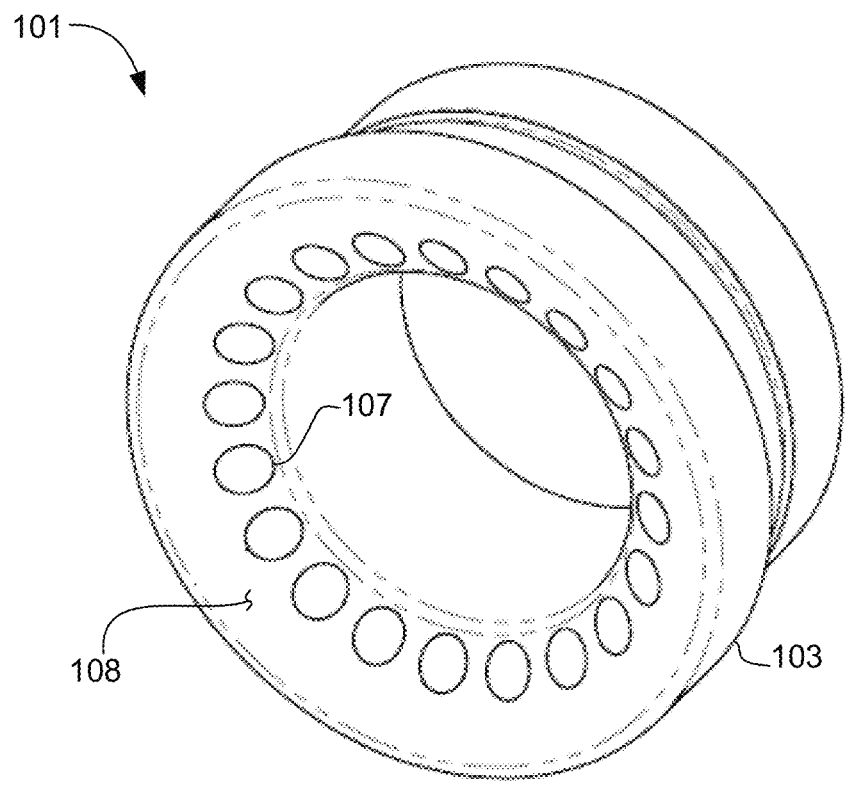
FIG. 4 is an upper perspective view of the seat assembly of FIG. 2 with optional material implants.
Figure 5:
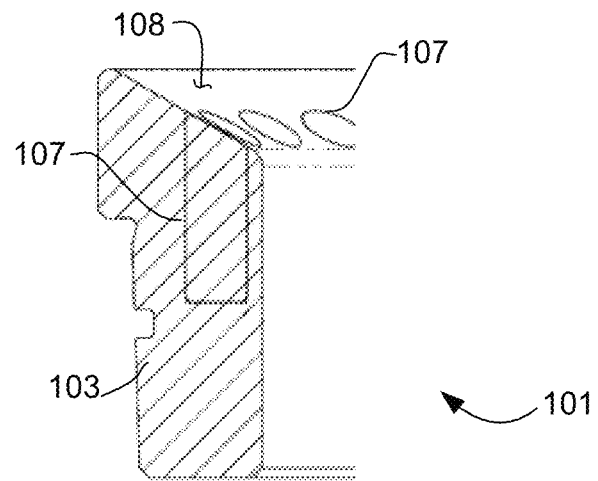
FIG. 5 is an exemplary side section view of the seat assembly of FIG. 4.

Referring now also to FIGS. 4 and 5 in the drawings, views of seat assembly 101 including a supplemental material 107 is illustrated. For simplicity, wiper 105 is not illustrated in the present set of Figures. Assembly 101 may include both material 107 and wiper 105. Assembly 101 is configured to receive repetitive forces from the operation of the valve along an internal surface of channel 104. This combined with the coarseness of the fracture fluid can generate a harsh environment for the interfacing seat. Seat body 103 may further include one or more supplemental material implants 107 along a tapered surface 108. The supplemental material 107 is configured to provide greater resistance to effects of wear, erosion, and fracture from operation of the fluid end. An example of a suitable material would be a carbide, Tungsten, or possibly a composite material. Any material harder than body 103 would be suitable. It is desired that the type of material be selected so as to limit the amount of dimensional fluctuation as possible as a result of temperature fluctuations.

Supplemental material 107 may be used in varied areas, orientations, and make up any volumetric ratio compared to conventional steel materials commonly used. As seen in FIGS. 4 and 5, seat body 103 includes a plurality of piles/columns of supplemental material 107. As seen in FIGS. 4 and 5, material 107 is inserted into predrilled holes along the surface 108 between seat body 103 and the valve. The supplemental material 107 may be heat shrunk into the holes and trimmed flush with the surface 108. Alternatively, the supplemental material 107 may be bonded in place. The hardness of material implant 107 is greater than that of the material of seat body 103. As seen in FIG. 4, 20 columns of supplemental material 107 are illustrated. This represents a contact surface having 40% supplemental material. Greater or lesser amounts may be used. Specific applications of assembly 101 may dictate particular ratios, sizes, and depths of the columns. Likewise, it is understood that the columns may be set at any depth below the contact surface.

The current application has many advantages over the prior art including at least the following: (1) Sharp wiping/scraper lip for efficient effective cleaning; (2) Continuous taper contact whilst the seat is assembled into the taper bore; (3) Full 360 degree contact area.; and (4) Controlled contact pressure for full assembly.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A valve seat assembly, comprising:
    a seat body having a central channel extending between an upper surface and a lower surface, the central channel having a tapered surface adjacent the upper surface, the seat body having an outer surface with an upper outer surface portion adjacent the upper surface of the seat body having a first diameter and a lower outer surface portion having a second diameter adjacent the lower surface of the seat body, the second diameter smaller than the first diameter, the seat body further having a notch formed in the outer surface adjacent the lower surface of the seat body at the intersection of the lower outer surface portion and the lower surface of the seat body; and
    a wiper seal disposed in the notch about the lower outer surface portion and adjacent the lower surface of the seat body, the wiper seal having a base with a lip protruding from the base and a groove formed in the base adjacent the lip, wherein the seal has a seal diameter at the lip that is larger than the second diameter.

2. The assembly of claim 1, wherein the notch is a recessed area for receiving the wiper seal, the recessed area being an inward protrusion in the lower outer surface portion of the outer surface of the seat body.

3. The assembly of claim 2, wherein the recessed area intersects with the lower surface of the seat body.

4. The assembly of claim 1, wherein the wiper seal includes a base coupled to the seat body and a lip configured to extend away from the base.

5. The assembly of claim 4, wherein the lip protrudes outward from the seat body.

6. The assembly of claim 4, wherein the lip includes a tip.

7. The assembly of claim 4, wherein the lip extends below the lower surface of the seat body.

8. The assembly of claim 4, wherein the lip is configured to flex about the base.

9. The assembly of claim 1, wherein the wiper seal extends below the lower surface of the seat body.

10. The assembly of claim 1, wherein the wiper seal is configured to flex inward and outward such that the seal diameter is configured to change in response to pressure.

11. The assembly of claim 1, wherein the wiper seal contacts the seat body around the entire periphery of at least one of the outer surface and the lower surface.

12. The assembly of claim 1, further comprising:
    a material implant recessed into the tapered surface of the central channel.

13. The assembly of claim 12, wherein the material implant is formed from a material with a hardness greater than the hardness of the seat body.

14. The assembly of claim 12, wherein the material implant is flush with the internal surface of the central channel.

15. The assembly of claim 12, wherein the material implant is secured in the seat body via at least one of a bonding process and a heat shrunk process.

16. A valve seat assembly, comprising:
    a seat body having a central channel extending between an upper surface and a lower surface, the central channel having a tapered surface adjacent the upper surface, the seat body having an outer surface with an upper outer surface portion having a first diameter adjacent the upper surface of the seat body and a lower outer surface portion having a second diameter adjacent the lower surface of the seat body, the second diameter smaller than the first diameter, the seat body further having a notch formed in the lower outer surface portion of the seat body at the intersection of the lower outer surface portion and the lower surface of the seat body; and
    a wiper seal disposed in the notch about the lower outer surface portion, the wiper seal having a base with a lip protruding from the base and a groove formed in the base adjacent the lip, wherein the base is seated in the notch and the lip extends outward from the base beyond the outer surface such that a diameter of the seal is greater than the second diameter.

17. The valve seat assembly of claim 16, wherein the notch has a radial width and an axial length and the seal has a radial width and an axial length, the axial length of the seal being the length from the base to a tip of the lip, wherein the axial length of the seal is greater than the axial length of the notch.

18. The valve seat assembly of claim 16, wherein the lip protrudes angularly from the base.

19. The valve seat assembly of claim 18, wherein the lip angles downwardly towards the lower surface of the seat body.

20. A valve seat assembly, comprising:
    a seat body having a central channel extending between an upper surface and a lower surface, the central channel having a tapered surface adjacent the upper surface, the seat body having an outer surface with an upper outer surface portion intersecting the upper surface of the seat body and having a first diameter and a lower outer surface portion intersecting the lower surface of the seat body and having a second diameter smaller than the first diameter, the seat body further having a notch formed at the intersection of the lower outer surface portion and the lower surface of the seat body; and
    a wiper seal disposed in the notch about the lower outer surface portion, the wiper seal having a base with a lip protruding from the base, wherein the base is seated in the notch and the lip extends outward from the base beyond the outer surface such that a diameter of the seal is greater than the second diameter.

21. The valve seat assembly of claim 20, wherein the lip protrudes angularly from the base.

22. The valve seat assembly of claim 21, wherein the lip angles downwardly away from the lower surface of the seat body.

23. The valve seat assembly of claim 22, wherein the lip extends beyond the lower surface of the seat body.

24. The valve seat assembly of claim 20, wherein the wiper seal includes a groove between the base and the lip.

25. The valve seat assembly of claim 20, wherein the notch has a radial width and an axial length and the seal has a radial width and an axial length, the axial length of the seal being the length from the base to a tip of the lip, wherein the axial length of the seal is greater than the axial length of the notch.

* * * * *